(12) United States Patent
Imaizumi

(10) Patent No.: US 8,313,815 B2
(45) Date of Patent: Nov. 20, 2012

(54) TUBE WITH PROJECTING PORTION RAISED ON TUBE SURFACE

(75) Inventor: Yasuyuki Imaizumi, Koto-ku (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 758 days.

(21) Appl. No.: 10/510,646

(22) PCT Filed: Jul. 31, 2003

(86) PCT No.: PCT/JP03/09711
§ 371 (c)(1), (2), (4) Date: Nov. 24, 2004

(87) PCT Pub. No.: WO2004/011343
PCT Pub. Date: Feb. 5, 2004

(65) Prior Publication Data
US 2005/0229993 A1    Oct. 20, 2005

(30) Foreign Application Priority Data
Jul. 31, 2002  (JP) ................................. 2002-223860

(51) Int. Cl.
*B29D 22/00* (2006.01)
*B65D 35/00* (2006.01)

(52) U.S. Cl. ........................................ 428/34.1; 222/92

(58) Field of Classification Search ............... 428/34.1, 428/34.6, 34.7; 206/222; 222/92–94, 95–107; 220/667, 669–671, 672–678
See application file for complete search history.

(56) References Cited

U.S. PATENT DOCUMENTS

| | | | | |
|---|---|---|---|---|
| 3,940,001 A * | 2/1976 | Haefner et al. | ............... | 215/12.2 |
| 4,338,278 A * | 7/1982 | Schultz | ..................... | 264/261 |
| 4,410,012 A * | 10/1983 | Redding et al. | ............... | 138/121 |
| 4,892,442 A * | 1/1990 | Shoffner | ..................... | 405/183.5 |
| 4,943,780 A * | 7/1990 | Redding | ..................... | 428/35.9 |
| 5,238,278 A * | 8/1993 | Kamper | ..................... | 294/74 |

(Continued)

FOREIGN PATENT DOCUMENTS
DE        976 538 C      10/1963
(Continued)

OTHER PUBLICATIONS

American Heritage Dictionary of the English Language: Fourth Edition. 2000. http://www.bartleby.com/61/1/L0030100.html Definition: Laminate.*

(Continued)

*Primary Examiner* — Rena Dye
*Assistant Examiner* — James Yager
(74) *Attorney, Agent, or Firm* — Oliff & Berridge, PLC

(57) ABSTRACT

The technical problem of this invention is to laminate the outer layer onto a main body of a tube, wherein a projecting portion or portions are formed, while maintaining certain uniformity. The object of this invention is to provide the laminated tube and molded tube products comprising the laminated tube, which shows the decorative effect, derived from the laminated outer layer, and enables the user to identify the tube only by touch. The outer layer is laminated onto the main body of the tube. By changing the number, width, or shape of the projecting portions, it is possible to give the decorative effect and identifiable features to the laminated tube. The laminated tube can be used to mold tube products, such as tubular containers and pouch containers.

15 Claims, 15 Drawing Sheets

U.S. PATENT DOCUMENTS

| | | | |
|---|---|---|---|
| 5,352,043 A * | 10/1994 | Takagaki et al. | 383/104 |
| 5,954,231 A * | 9/1999 | Durliat et al. | 222/1 |
| 6,065,715 A * | 5/2000 | Andersson | 242/571.1 |
| 2001/0030192 A1 * | 10/2001 | Redmond | 220/203.08 |

FOREIGN PATENT DOCUMENTS

| | | |
|---|---|---|
| DE | 29 30 783 | 6/1980 |
| FR | 2 563 189 | 10/1985 |
| GB | 1 116 910 A | 6/1968 |
| GB | 2 191 167 A | 12/1987 |
| JP | U 61-8544 | 1/1986 |

OTHER PUBLICATIONS

American Heritage Dictionary of the English Language: Fourth Edition. 2000. http://www.bartleby.com/61/94/T0399400.html Definition: Tube.*

Translation of JP 61-8544, Jan. 1986.*

* cited by examiner

Fig. 1
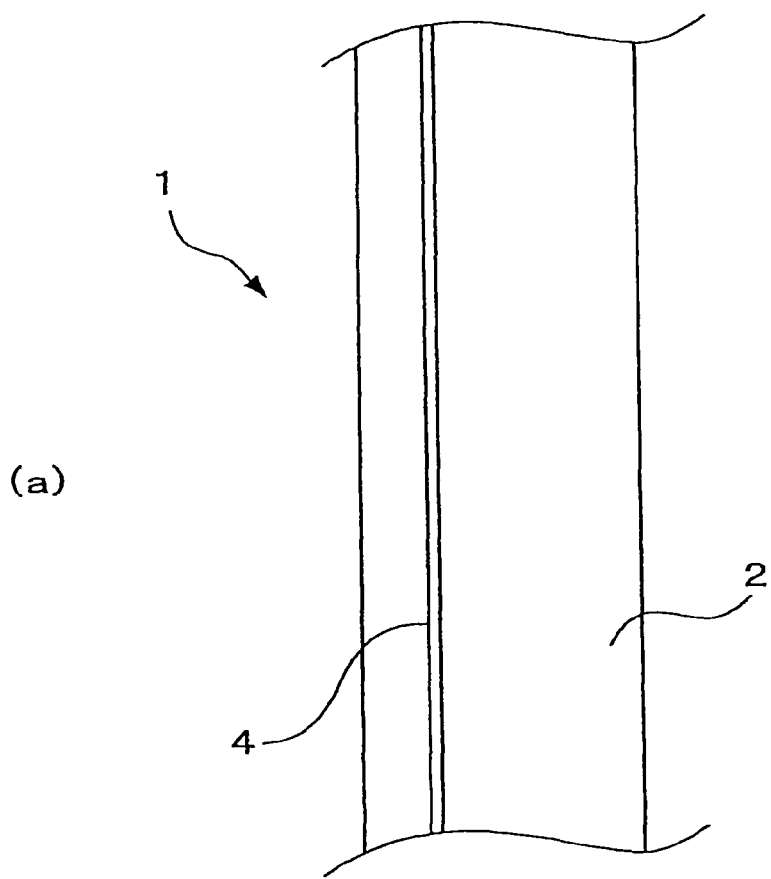
(a)
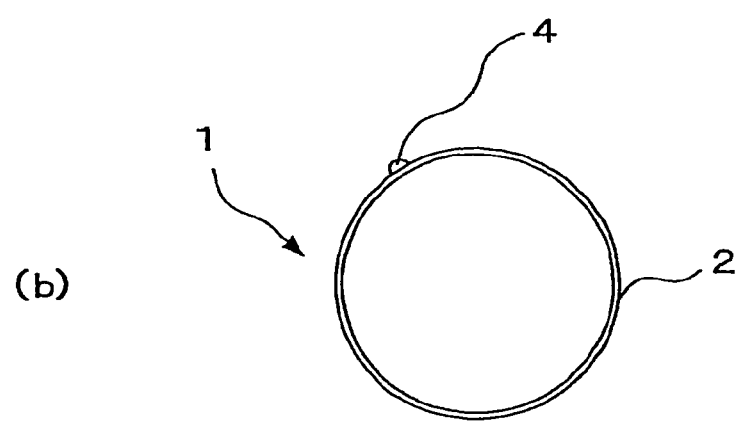
(b)

Fig. 5
(a)
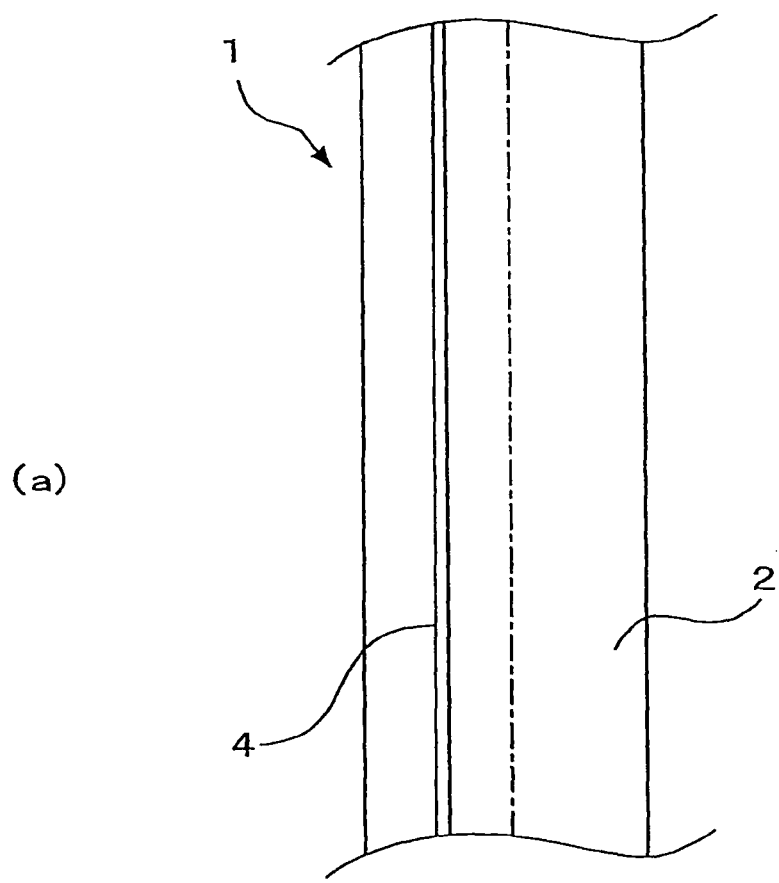
(b)
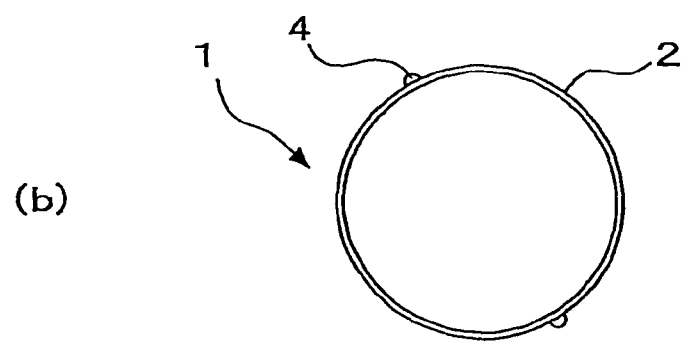

Fig. 9
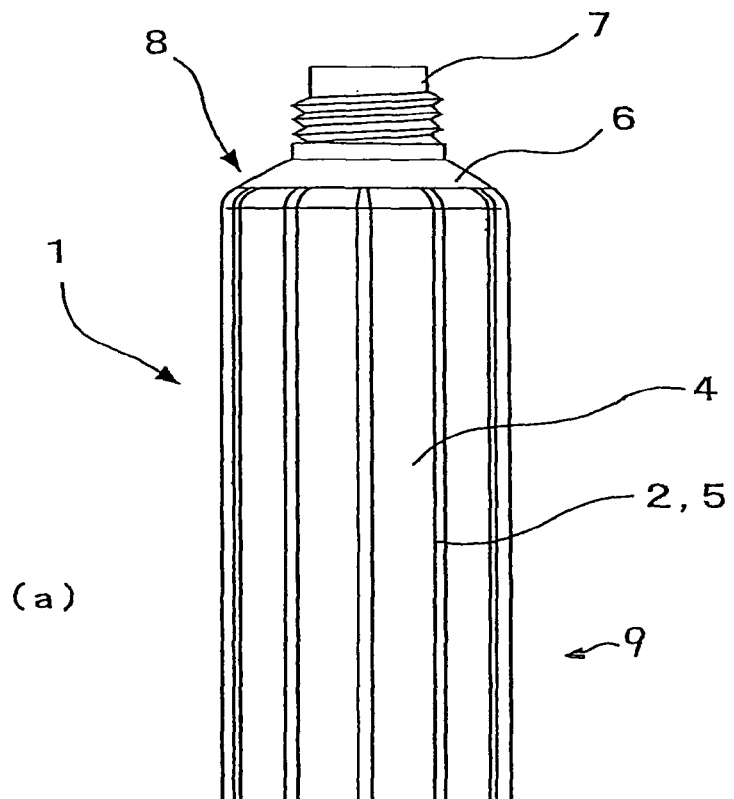
(a)
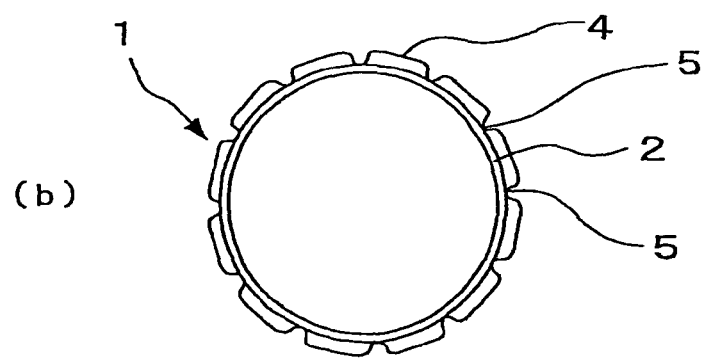
(b)

(a)

(b)

TUBE WITH PROJECTING PORTION RAISED ON TUBE SURFACE

TECHNICAL FIELD

This invention relates to a tube having an outer layer laminated onto a substrate layer and to molded products using this tube.

BACKGROUND ART

Conventionally, there are known those tubes of a laminated structure in which the outer layer is laminated onto the substrate layer. These laminated tubes usually have a structure in which the outer layer is laminated uniformly in the peripheral direction of the tube cross-section.

The molded products of a laminated structure, in which an outer layer is laminated onto the substrate layer, are obtained by, for example, co-extruding two different types of synthetic resins or cladding the substrate layer with the second layer. In this cladding method, the substrate layer has already been made into a tube, and is clad with the second layer by an ordinary extrusion-molding process.

On the other hand, the co-extrusion molding method utilizes a molding die that has two or more separate flow paths for the molten resins and lets these flow paths merge within the die. The molding die has such a cross-section that gives the shape of a resinous tube. Two types of resins are molten and run through the respective flow paths. The two layers are welded firmly to each other, and the laminated tube is extruded from the die exit in the cross-sectional shape of the die, and is left to cool.

The laminated tubes made by conventional co-extrusion molding process has difficulty in preventing cuts in the outer layer to be laminated onto the substrate layer and also in cladding the outer layer in the uniform thickness because each synthetic resin has a different softening point and flow resistance. A technology for laminating the outer layer onto the substrate layer at a uniform thickness has been developed to solve this problem.

In the cladding method, too, it is also difficult to clad the substrate layer with the outer layer at a uniform thickness because there is a pressure difference generated in the resin inside the head of the extrusion-molding die. In order for this problem to be solved, a technology has been developed to extrude the outer layer in a pipe shape from the molding die having a diameter larger than the outer diameter of the tubular substrate layer and to make the outer layer stick onto the substrate layer by sucking the outer layer from the nipple side of the die exit under reduced pressure.

However, if the outer layer laminated onto the substrate layer has a uniform thickness, the tube looks even and monotonous and lacks spice, thus giving no decorative effect. Furthermore, the tube cannot be identified simply by touch.

Meanwhile, even in the case where the outer layer laminated onto the substrate layer has some irregularity in molding the laminated tube, it is necessary to produce the irregularity while maintaining certain uniformity if a high-class image is to be achieved in addition to aesthetic appearances.

Consequently, the technical problem of this invention is to laminate the outer layer onto the substrate layer that makes up the main body of the tube, wherein the outer layer is a projecting portion or portions while maintaining certain uniformity. The object of this invention is to provide the tube and the molded tube products comprising the tube, which show the decorative effect derived from the projecting portion(s) and which enable the user to identify the tube by touch, too.

DISCLOSURE OF THE INVENTION

The means of carrying out the invention to solve the above-described technical problem exists in the configuration that the tube is laminated and that the outer layer laminated onto the substrate layer, which makes up the main body of the tube, comprises a projecting portion disposed in the axial direction.

An outer layer being a linear projecting portion in the axial direction is laminated onto the substrate layer that makes up the main body of the tube. The linear projecting portion on the outer surface of the tube gives the tube the decorative quality that makes the tube look attractive. It also becomes possible to distinguish the tube from other tubes simply by touching the projecting portion on the tube surface with fingers.

Even if a relatively soft outer-layer is disposed on the substrate layer, the thin wall of the tube deforms easily because of the difference in thickness between the projecting portion and the tube wall. Therefore, the main body of the tube can be easily pressed flat along the projecting portion on the outer layer. The tube contents can be easily squeezed out of the molded tube product made of this laminated tube.

The means of carrying out the invention includes that the substrate layer is flexible and that the outer layer is harder than the substrate layer.

The substrate layer that makes up the main body of the tube has flexibility, and the projecting portion to be laminated on the substrate layer is harder than the substrate layer. Therefore, this projecting portion serves as the backbone of the main body of the tube, and maintains the form of the tube stably.

The means of carrying out the invention includes that the projecting portion is disposed linearly in the axial direction.

There is provided the linear projecting portion, which is laminated onto the main body of the tube. The tube can be pressed flat along this projecting portion that acts as the backbone of the tube. Thus, the projecting portion serves as the guide when the tube is pressed flat.

The means of carrying out the invention includes that plural projecting portions are provided.

Plural projecting portions are formed in stripes on the main body of the tube. The stripes improve decorativeness of the tube. From the number of stripes determined for the tube, the user can distinguish the tube from other tubes simply by touch.

The means of carrying out the invention includes that the projecting portions are disposed axisymmetrically in the cross-sectional view.

The projecting portions are disposed axisymmetrically. The tube can be pressed flat along the axisymmetrical projecting portions, thus making it convenient for the tube bottom to be sealed when tubular containers or pouch containers are molded. As another advantage, the projecting portions serve as the guide to press and flatten the tubular container or pouch container so that the contents can be easily squeezed out of the tubular or pouch container made of this laminated tube.

The means of carrying out the invention is provided with the projecting portions that have different widths.

The projecting portions having different widths make the tube look very attractive, and allow characters and the like to be printed on the wide types of projecting portions.

The means of carrying out the invention includes a configuration in which even-numbered projecting portions are disposed at equal intervals on the laminated tube.

Because the projecting portions are disposed at equal intervals, a stripe pattern is formed over the entire tube surface, and the decorativeness of the tube is improved.

The means of carrying out the invention includes that the projecting portions give a graded effect caused by the change in the thickness of the projecting portions disposed on the laminated tube.

The tube has the improved decorativeness because of the graded effect caused by the change in the thickness of the projecting portions.

The means of carrying out the invention includes that an aluminum laminating material is used as the main body of the tube.

The main body of the tube comprises an aluminum laminating material, and the projecting portion or portions are laminated onto this material. The projecting portion or portions serving as the backbone reinforce the aluminum laminated tube, and also improves the decorativeness.

The means of carrying out the invention includes that the substrate layer and the outer layer have different colors in the tube.

Not only tube irregularity but also additional colors improve the decorativeness because the outer layer in a different color is laminated onto the substrate layer.

The means of carrying out the invention includes that the projecting portion or portions are disposed spirally on the surface of the tube.

The means of carrying out the invention includes that the projecting portion or portions have a wave form on the surface of the tube.

The projecting portion or portions are formed in a spiral or wave form, which looks attractive visually and improves decorativeness of the tube.

The means of carrying out the invention includes the configuration that each of the projecting portions has a different color.

The decorativeness of the tube is improved because each projecting portion has a different color and because the projecting portions in attractive colors form a stripe or a waveform pattern. For instance, all the projecting portions may have a different color, or two or three colors may be repeated alternately or for each group of three projecting portions. Plural colors may also be used at random for the projecting portions.

The means of carrying out the invention includes that the tube is cut to a predetermined length, with one end being flattened and sealed, and the other end being provided with a head portion comprising shoulder and neck.

The means of carrying out the invention includes that the tube is cut to a predetermined length and is molded into a tube product having both ends flattened and sealed.

The tube with added decorativeness can be used to mold an elaborately designed tube products.

BRIEF DESCRIPTION OF THE DRAWINGS

FIG. 1(*a*) is a partially cut, side elevational view, and FIG. 1(*b*) is a cross-sectional view, of the tube in the first embodiment of this invention.

FIG. 5(*a*) is a partially cut, side elevational view, and FIG. 5(*b*) is a cross-sectional view, of the tube in the second embodiment of this invention.

FIG. 9(*a*) is a side elevational view, and FIG. 9(*b*) is a cross-sectional view, of the tubular container using the tube in the fifth embodiment of this invention.

PREFERRED EMBODIMENTS OF THE INVENTION

Figure 2:
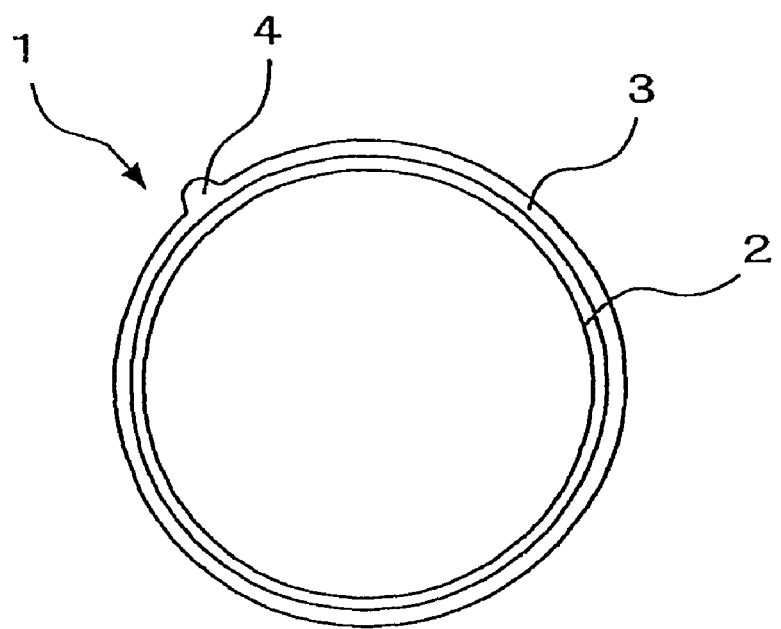
FIG. 2 is a cross-sectional view showing another example of the tube shown in FIG. 1.

This invention is further described with respect to preferred embodiments, now referring to the drawings, in which FIG. 1(*a*) is a side elevational view, and FIG. 1(*b*) is a cross-sectional view, of the tube 1 in the first embodiment of this invention.

As shown in FIGS. 1(*a*) and 1(*b*), the tube has a laminated structure including an outer layer 3 and a linear projecting portion 4 that extends in the axial direction, each of which is laminated onto the cylindrical substrate layer 2 that makes up the main body of the tube.

The projecting portion 4 can be formed when the outer layer 3 is laminated onto only a part of the substrate layer 2. In addition, as shown in FIG. 2, the projecting portion 4 can also be formed by changing the thickness of the laminated outer layer 3 at one point of the cross-section.

Figure 3:
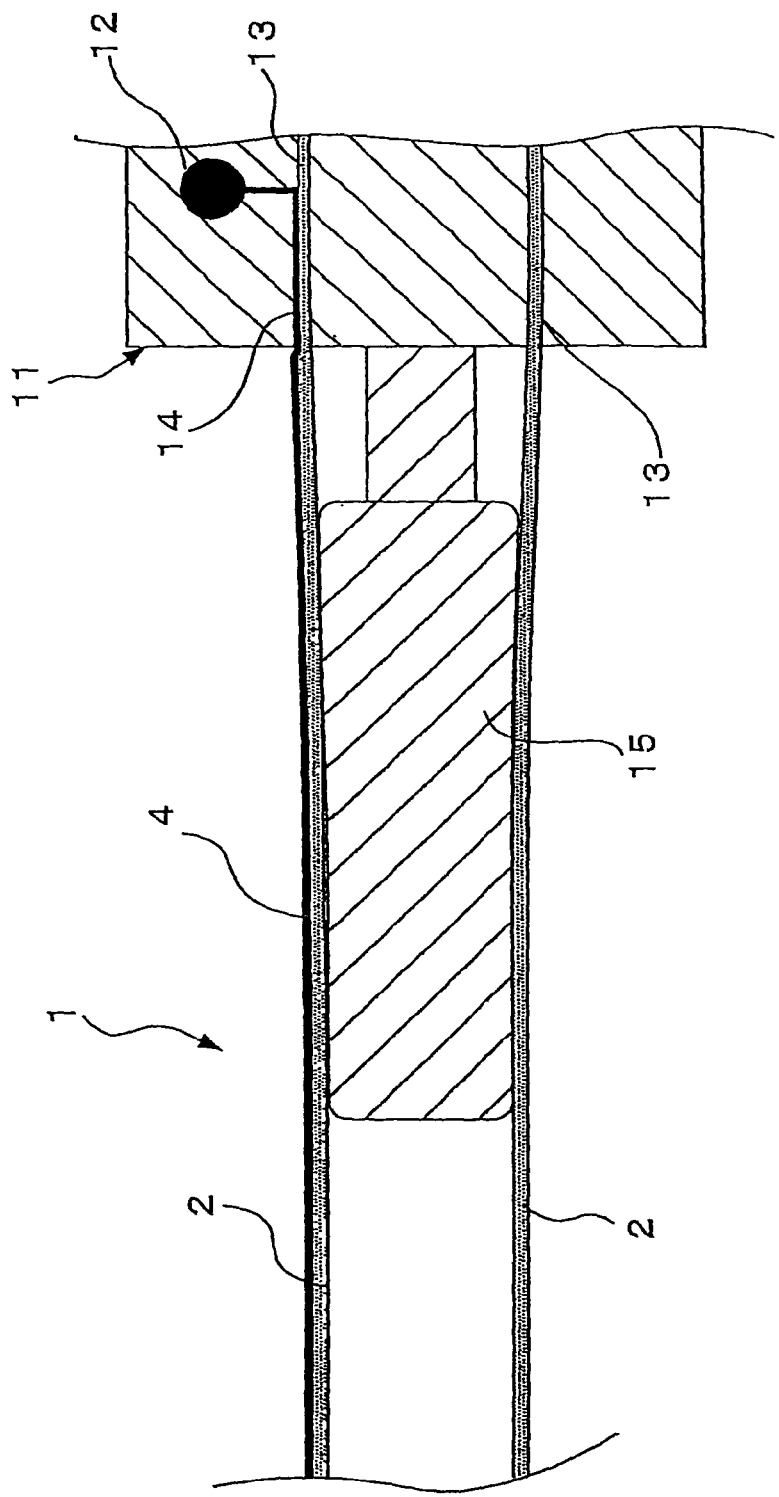
FIG. 3 is a cross-sectional view showing an example of the co-extrusion molding die of this invention.

FIG. 3 is a sectional view showing schematically a system for the co-extrusion molding of the tube 1. This system has die 11, which is connected to the first extruder and the second extruder (both of them now shown). The first extruder supplies the die 11 with a molten resin from which the substrate layer 2 is molded. The second extruder supplies the die 11 with another molten resin from which the outer layer 3 is molded.

The die 11 is connected to the first extruder by way of a circular path. A substrate layer resin path 13 is in a tubular shape and is connected to this circular path. An outer layer resin path 14 is disposed at one point on the periphery of the substrate layer resin path 13. This outer layer resin path 14 is connected to the second extruder by way of a resin discharge port 12. A mandrel 15 is disposed ahead of the exit of the die 11.

A molten resin is extruded by the first extruder, takes the shape of a tube in the circular path, and flows through the substrate layer resin path 13. Another molten resin is extruded by the second extruder, comes out of the resin discharge port 12, and flows into the outer layer resin path 14.

In the die 11, the molten resin coming from the outer layer resin path 14 adheres onto the surface of the tubular molten resin that flows through the substrate layer resin path 13. In this way, the outer layer 3 is adhered onto the surface of the tubular substrate layer 2 at a thickness that is uniform in the axial direction. Thus, a projecting portion 4 is formed on the substrate layer 2, as shown in FIG. 5, on the outer layer 3, which is adhered to the substrate layer 2, as shown in FIG. 2.

Consequently, the laminated tube 1 having the projecting portion 4 on the substrate layer 2 is extruded.

In FIG. 3, mandrel 15 stably retains the shape of the laminated tube 1 comprising the combined substrate layer 2 and the outer layer 3 having or consisting of a projecting portion 4 when the tube is pushed out of the die exit. The co-extrusion molding die also comprises a cooling system to cool down the laminated tube 1 that has been extruded from the molding die 11, a pulling system to pull the extruded laminated tube 1, and a cutting device to cut the laminated tube to a suitable length although these systems are not shown. The laminated tube 1 is manufactured after it passes through the processes using these systems.

At that time, a synthetic resin is suitably selected so that the substrate layer 2 to be formed has flexibility. On the other hand, another synthetic resin is selected so that the outer layer 3 is harder than the substrate layer 2.

The co-extrusion molding process such as described above makes it possible to mold the laminated tube 1, in which the outer layer 3 having or consisting of the projecting portion 4, axially uniform in thickness, is laminated onto the substrate layer 2.

The projecting portion 4 creates irregularity on the surface of the laminated tube 1. This irregularity improves the decorativeness and makes the tube 1 look attractive visually. If the substrate layer 2 and the outer layer 3 have different colors, the projecting portion 4 on the substrate layer 2 can be clearly identified by its color, thus resulting in improved designing.

Since the projecting portion 4 can be identified simply by touch, it is easy to distinguish the laminated tube 1 from other tubes.

Figure 4:
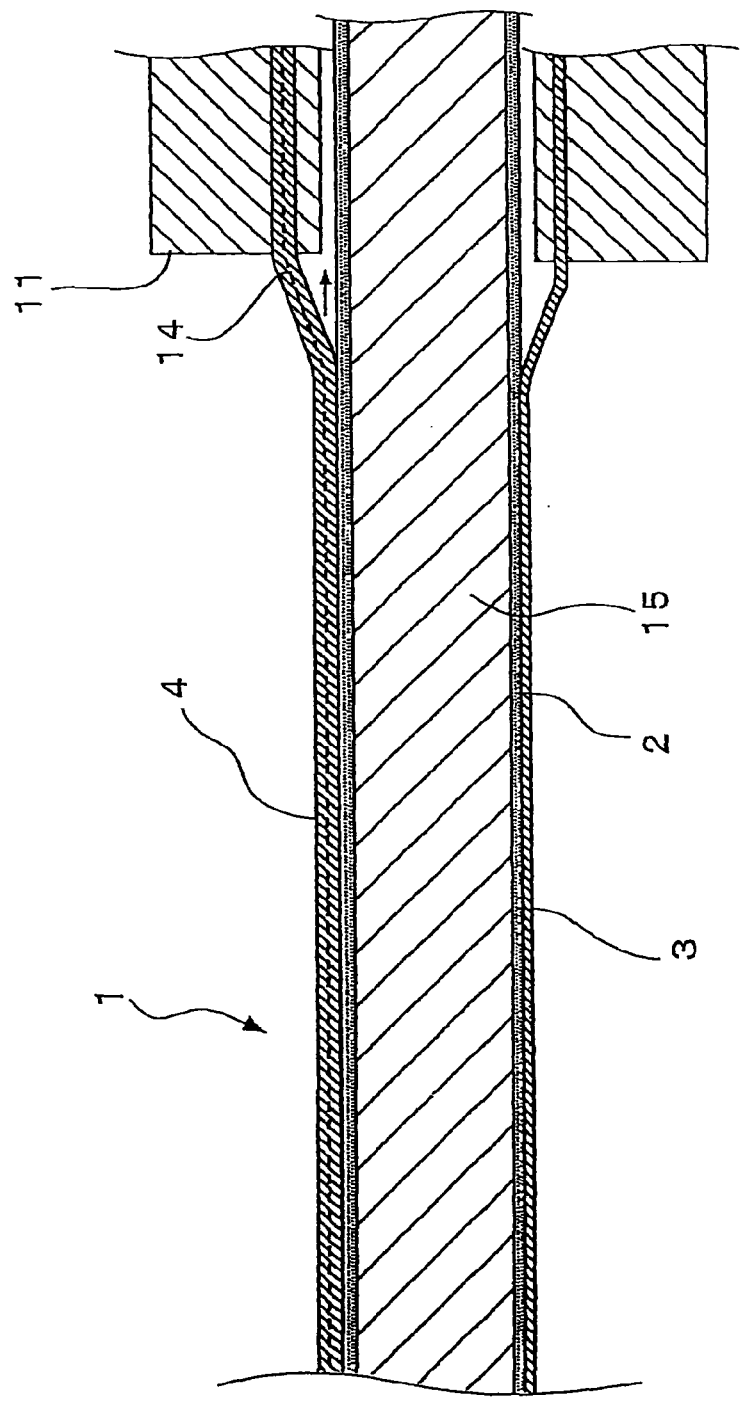
FIG. 4 is a vertical section showing an example of the cladding die of this invention.

FIG. 4 is a vertical section showing schematically a part of the molding die to mold the tube by the cladding method. As shown in FIG. 4, the molten resin to be used as the outer layer 3 is pushed by the extruder from the resin discharge port (not shown) and flows into the outer layer resin flow path 14 in the die 11.

The outer layer resin flows through the outer layer resin flow path 14 and comes out of the die exit where the diameter becomes much larger than the outer diameter of the tubular substrate layer 2. The circular die exit has a space at one point so that the projecting portion 4 is formed. The outer layer 3 is suctioned under reduced pressure in the direction shown by an arrow in FIG. 4. The already tubular main body 2 is supported by the mandrel 15, and the outer layer 3 is put in tight contact with the substrate layer 2. Thus, the substrate layer 2 is clad with the outer layer 3 having or consisting of the projecting portion 4 that is axially uniform in thickness.

For example, a flexible aluminum laminating material can be used as the already tubular substrate layer 2. Then, the outer layer 3 may be made of a synthetic resin material that is harder than the aluminum laminating material from which the substrate layer 2 is made.

Thus, the cladding method can also be utilized to mold the tube 1, in which the the projecting portion 4, which extends axially, is laminated on the substrate layer 2, as shown in FIG. 5, or on the outer layer 3, which is laminated on the substrate layer 2, as shown in FIG. 2.

In both of the co-extrusion molding method and the cladding method, the axially disposed projecting portion 4 has a uniform thickness. Unlike any surface defect, such a projecting portion 4 gives improved decorativeness to the laminated tube and is also capable of achieving a high-class image.

By changing the shape of the exit of the die 11, it is possible to change the number, width, or shape of the projecting portion 4 on the laminated tube 1.

FIG. 5 are (a) a side elevational view, and (b) a cross-sectional view, of the tube 1 in the second embodiment of this invention wherein two projecting portions 4 are disposed axisymmetrically on the substrate layer 2.

The two projecting portions 4 disposed axisymmetrically on the substrate layer 2 enable the tube 1 to be pressed flat easily. A pair of the projecting portions 4 is made of a harder material than the substrate layer 2, which makes up the main body of the tube, and these projecting portions 4 serve as the backbone for the substrate layer 2 made of a flexible material, as shown in FIG. 5. The tube 1 is thus pressed flat and sealed to form a molded tube product, such as a tubular container or a pouch container made of this tube 1.

Figure 6:
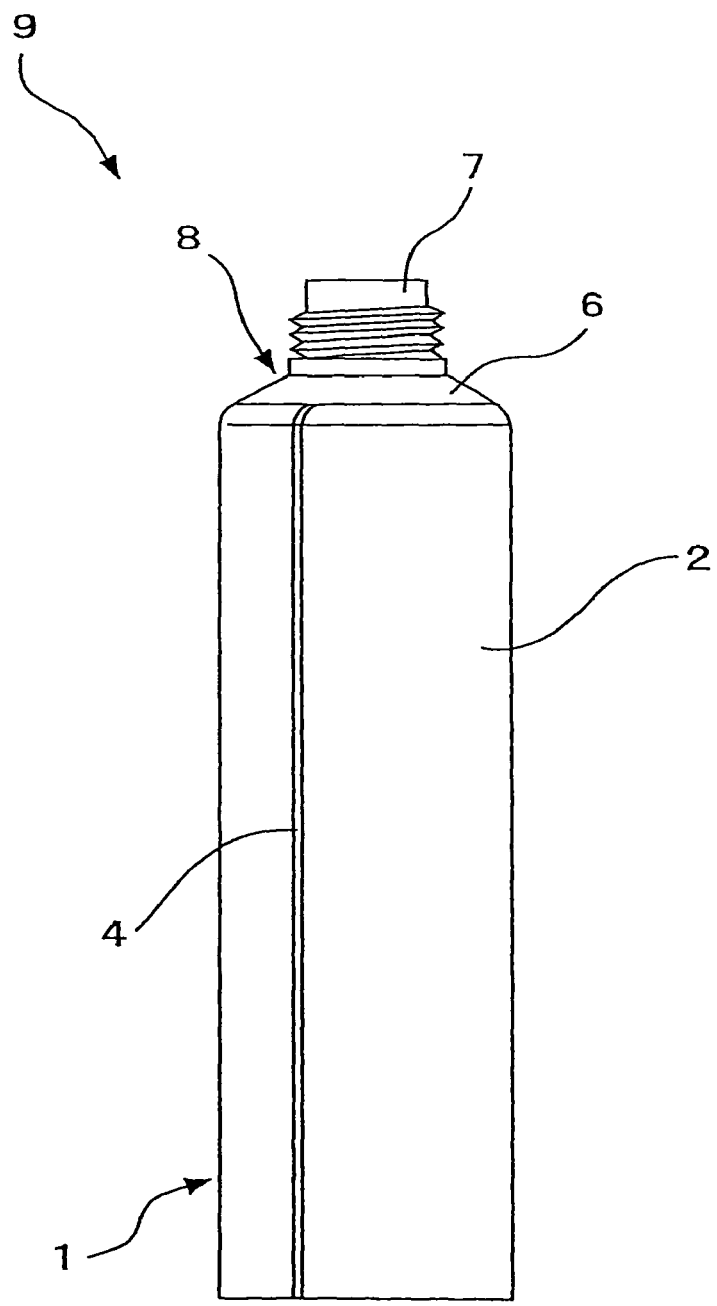
FIG. 6 is a side elevational view of the tubular container made by using the tube shown in FIG. 5.

FIG. 6 shows a tubular container 9, one of the tube products, obtained by cutting the tube 1 of FIG. 5 to a certain length, flattening and sealing one end of the tube, and fitting a head 8 to the tube by means of Thatcher method. This head 8 comprises shoulder 6 and neck 7. The tube portion of the tubular container 9 can be pressed flat, with the axisymmetrical projecting portions 4 serving as the guide. Therefore, the contents inside the tubular container 9 can be discharged easily.

Figure 7:
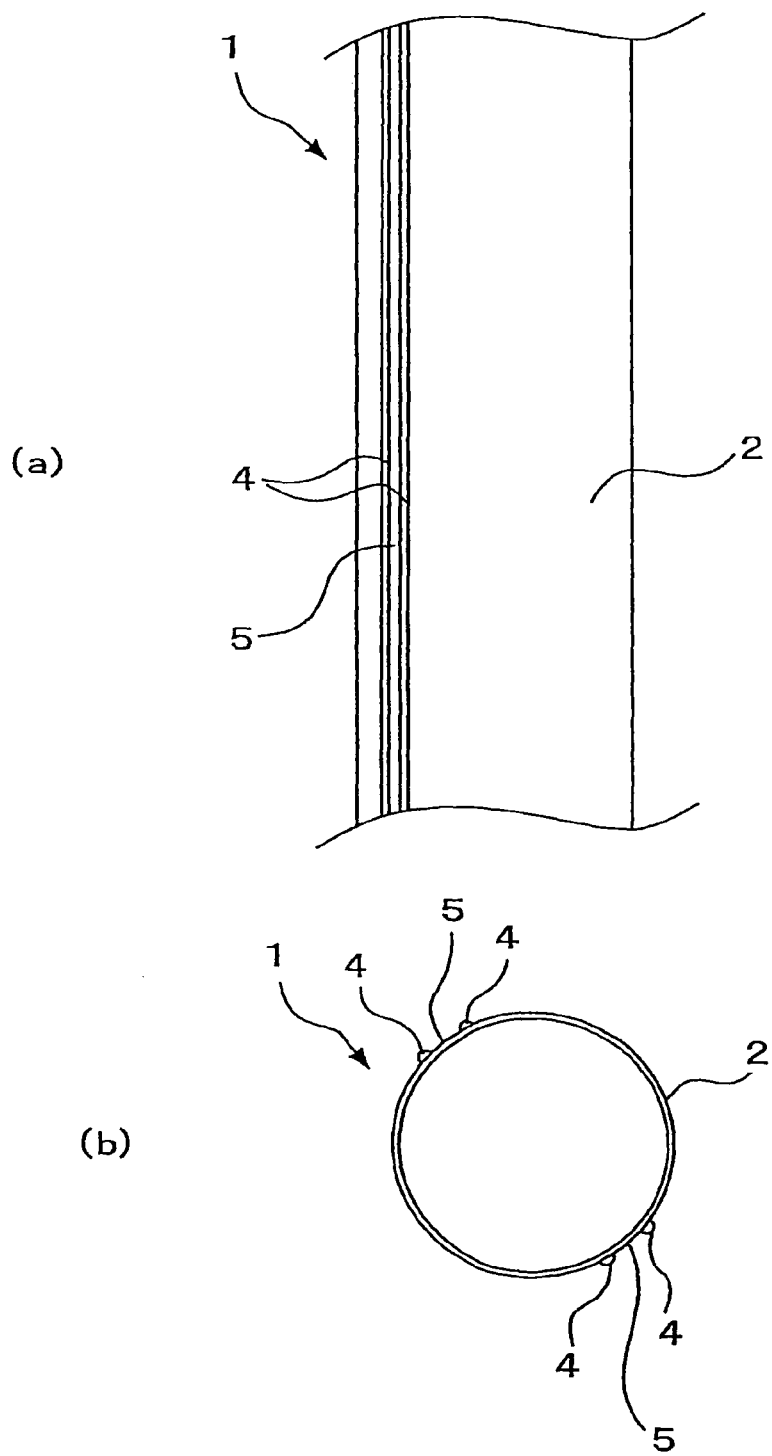
FIG. 7(*a*) is a partially cut, side elevational view, and FIG. 7(*b*) is a cross-sectional view, of the tube in the third embodiment of this invention.

FIG. 7 shows the tube 1 in the third embodiment of this invention wherein the tube 1 is provided with four projecting portions 4, which are disposed axisymmetrically. In this case, the tube 1 of this embodiment is easily pressed flat because the groove portion 5 between the two projecting portions 4 on each side is folded and thrust outward.

When the projecting portions 4 are formed by the outer layer 3 laminated onto the substrate layer 2, a certain number of projecting portions 4 can be designated for the specified contents to be filled in the tubular container 9 or later-described pouch container molded from the tube 1. The user will be able to distinguish the contents inside the tube product, simply by touching the tubular or pouch container 9 or 10. Therefore, this feature is convenient especially for the blind. It is also convenient for the user with ordinary sight in using plural tubular or pouch containers 9 or 10 for different purposes.

Figure 8:
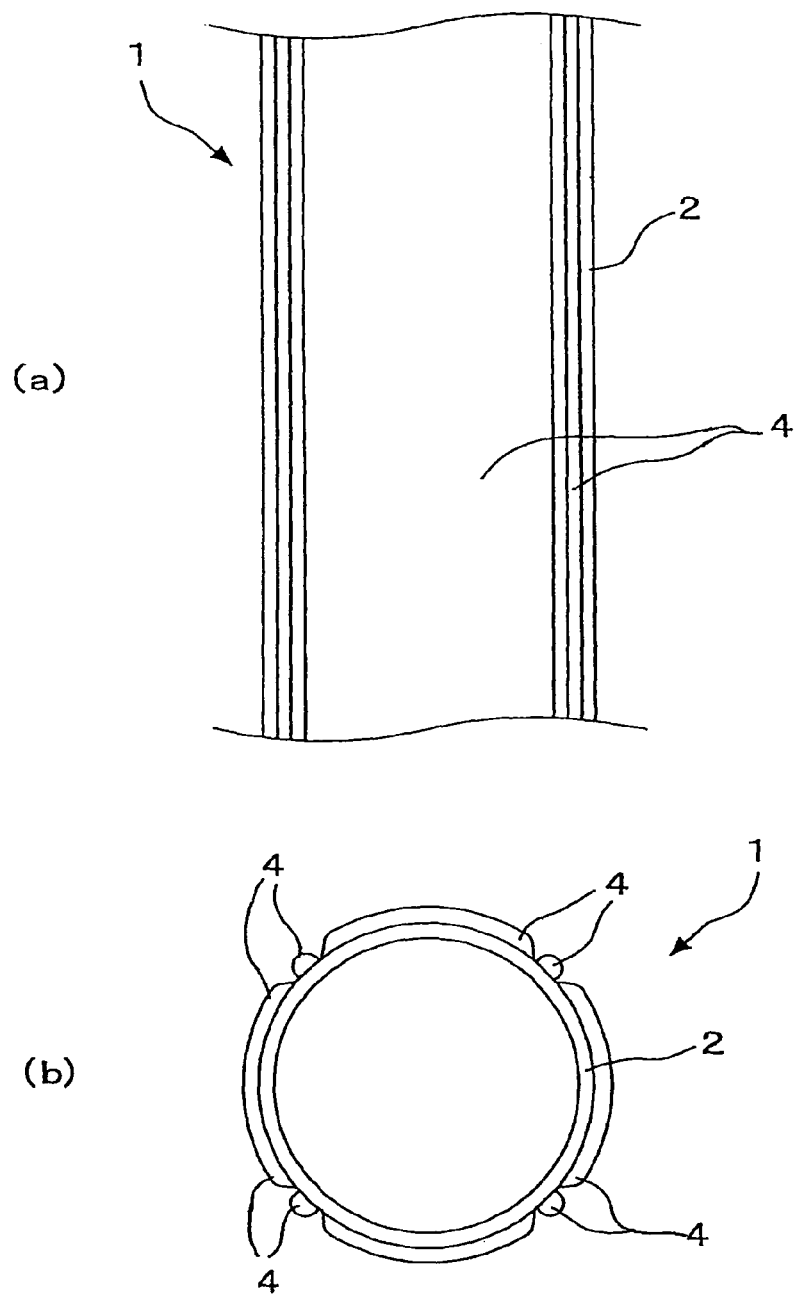
FIG. 8(*a*) is a partially cut, side elevational view, and FIG. 8(*b*) is a cross-sectional view, of the tube in the fourth embodiment of this invention.

FIG. 8 shows the tube 1 in the fourth embodiment of this invention wherein the outer layer 3 on the substrate layer 2 has, positioned on it, projecting portions 4 having different widths. Plural projecting portions 4 of different widths improve visual attractiveness of the tube.

FIG. 9 shows a tubular container 9 using the tube 1 in the fifth embodiment of this invention, wherein the outer layer 3 laminated onto the substrate layer 2 consists of an even number of strip-like projecting portions 4 disposed in equal intervals. Under the configuration that an even number of projecting portions 4 are disposed in equal intervals on the substrate layer that makes up the main body of the tube, the tube 1 has an up-and-down stripe pattern, which improves the decorativeness of the tube.

Since the projecting portions 4 are disposed in an even number and in equal intervals, naturally there is an even number of grooves 5 between the projecting portions 4. In this configuration, the tube 1 can be easily pressed flat, with the projecting portions 4 serving as the guide. This feature is convenient when the tubular container 9 or the pouch container 10 (See FIG. 10) is molded. Because the tubular container 9 or the pouch container 10 can be squeezed and pressed flat, using the projecting portions as the guide, the contents can be forced out smoothly from the tubular or pouch container 9 or 10, thus improving container handling.

Figure 10:
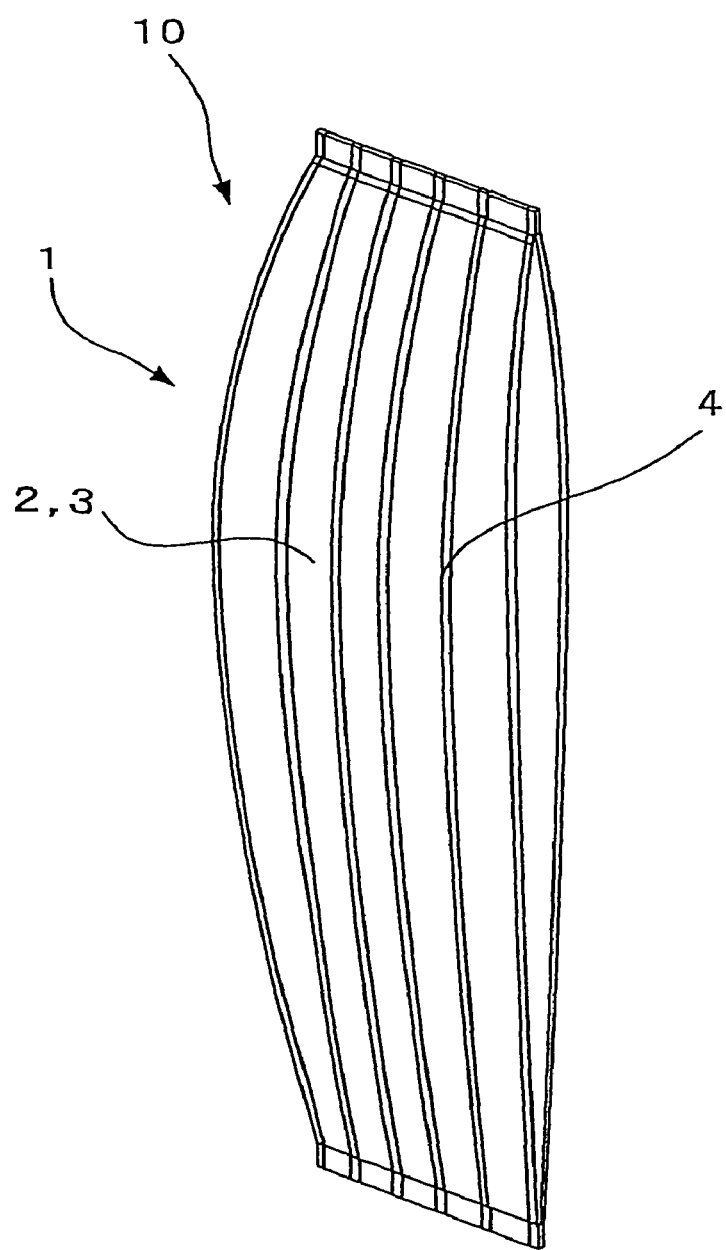
FIG. 10 is a perspective view of the pouch container molded from the tube.
Figure 11:
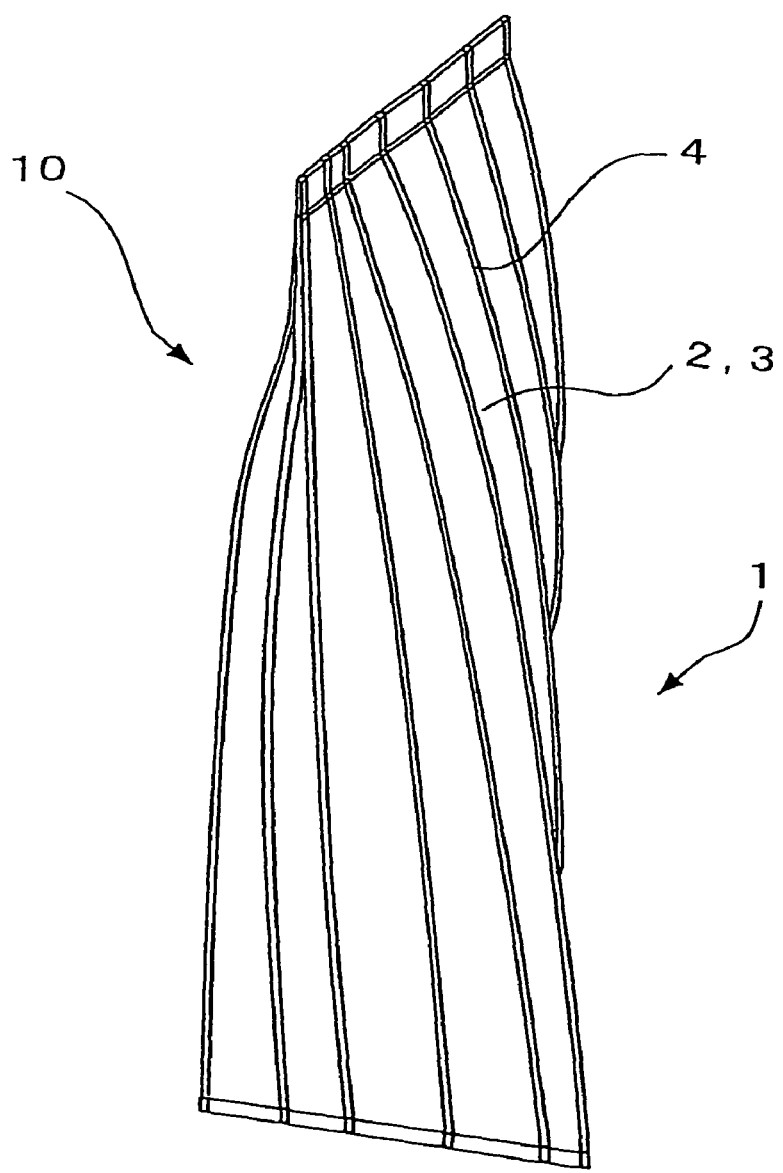
FIG. 11 is a perspective view showing another example of the pouch container molded from the tube.

As shown in FIGS. 10 and 11, the tube 1 can be used to mold the pouch container 10. The tube 1 is cut to a certain length, pressed flat and sealed at one end. Then, after the container has been filled with the contents, the other end is similarly pressed flat and sealed. There can be obtained a pouch container 10 with both ends being flattened in the same direction, as shown in FIG. 10, or there can be obtained another pouch container 11 with one end is in a direction orthogonal to the other end, as shown in FIG. 11.

Figure 12:
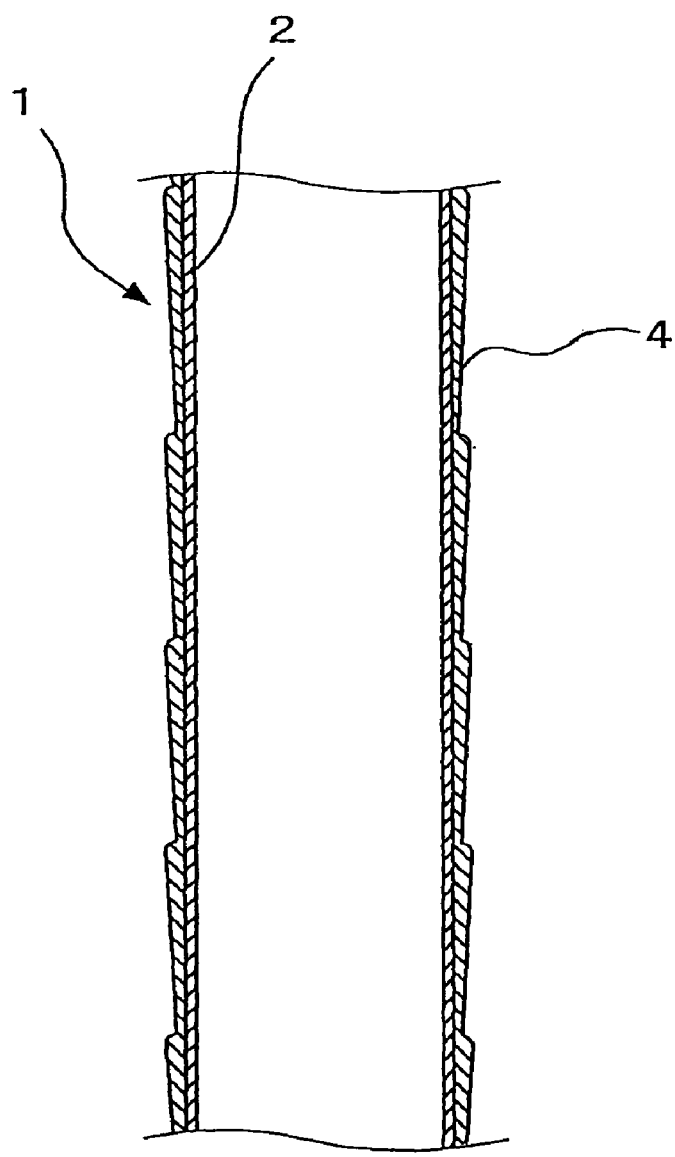
FIG. 12 is a vertical section of the tube in the sixth embodiment of this invention.

FIG. 12 is a vertical section of the tube 1 in the sixth embodiment of this invention. As shown in FIG. 12, the tube 1 comprises the substrate layer 2 that makes up the main body of the tube. In this embodiment, the outer layer 3 laminated onto the substrate layer 2 has or consists of the projecting portions 4, the thickness of which is changing in the axial direction. In the case of the co-extrusion molding method, the thickness of the outer layer 3 can be changed by changing periodically the extruding pressure for the outer layer 3. In the case of the cladding method, it can be changed by changing periodically the extent of suction under reduced pressure.

The outer layer 3 having or consisting of the projecting portions 4 gives a graded effect caused by the change in the thickness. This gradation improves the decorativeness of the tube 1.

Figure 13:
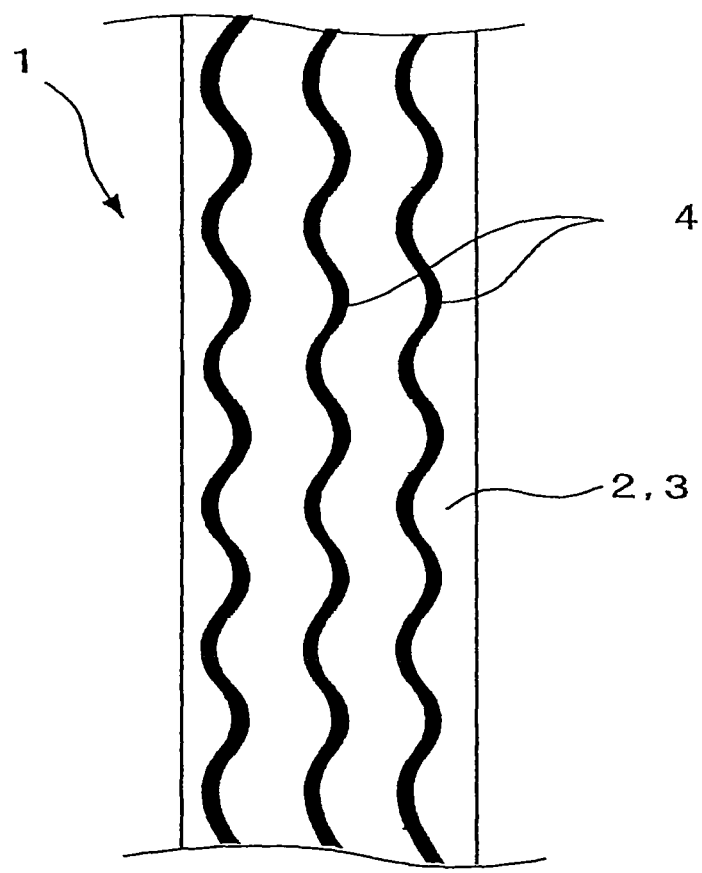
FIG. 13 is a partially cut, side elevational view of the tube in the seventh embodiment of this invention.

FIG. 13 shows the tube 1 in the seventh embodiment of this invention, wherein the projecting portions 4 has a waveform pattern. In addition to the linear projecting portions, the waveform projecting portions 4 can be obtained by moving the die 11 from side to side at a certain stroke when the tube 1 is molded. The waveform pattern improves the decorativeness and visual attractiveness of the tube 1.

Figure 14:
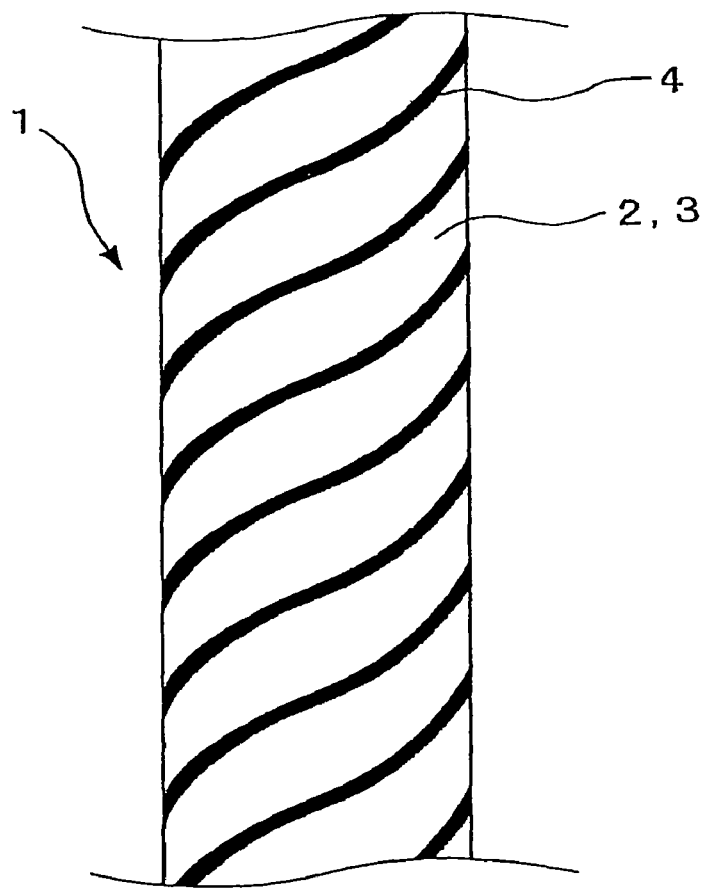
FIG. 14 is a partially cut, side elevational view of the tube in the eighth embodiment of this invention.

FIG. 14 shows the tube 1 in the eighth embodiment of this invention wherein spiral projecting portions 4 are formed. Not only the linear and waveform projecting portions, but also the spiral projecting portions 4 can be obtained by rotating the die 11 on its axis in a certain rotative direction when the tube 1 is molded. The spiral pattern improves the decorativeness and visual attractiveness of the tube 1.

Figure 15:
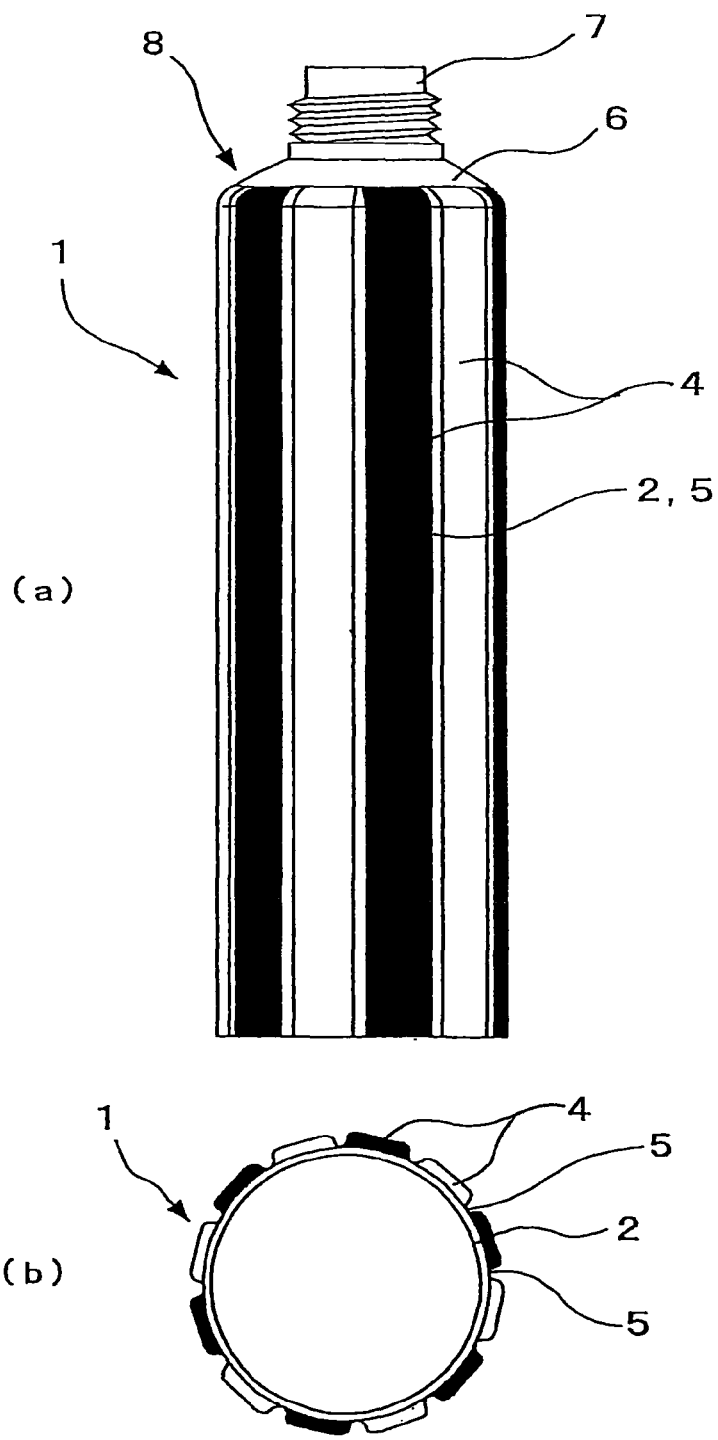
FIG. 15(*a*) is a side elevational view, and FIG. 15(*b*) is a cross-sectional view, of the tube in the ninth embodiment of this invention.

FIG. 15 shows the tube 1 in the ninth embodiment of this invention wherein each projecting portion 4 has a different color. As shown in FIG. 15, the projecting portions 4 of different colors give the tube 1 colorful stripe or waveform patterns, which improve decorativeness and designing of the tube 1. Although FIG. 15 shows the projecting portions 4 in two colors that are alternately disposed, the pattern need not be limited to this embodiment. The projecting portions 4 in plural colors can be used, or each projecting portion 4 may have a different color. Plural colors can also be used at random for each projecting portion 4.

EFFECTS OF THE INVENTION

The outer layer and the linear projecting portion in the axial direction, as shown in FIG. 2, is laminated on the substrate layer that makes up the main body of the tube, or the linear projecting portion in the axial direction, as shown in FIG. 5, is laminated on the substrate layer that makes up the main body of the tube. The linear projecting portion on the outer surface of the tube gives the tube the decorative quality that makes the tube look attractive. It also becomes possible to distinguish the tube from other tubes simply by touch.

The outer layer and projecting portion are harder than the substrate layer, and are laminated on the flexible substrate layer that makes up the main body of the tube, as shown in FIG. 2. Alternatively, the projecting portion is harder than the substrate layer, and is laminated on the flexible substrate layer that makes up the main body of the tube, as shown in FIG. 5. Therefore, this projecting portion serves as the support to the main body of the tube, and maintains the form of the tube stably.

There is provided the outer layer and a linear projecting portion on the main body of the tube, as shown in FIG. 2, or a linear projecting portion on the main body of the tube, as shown in FIG. 5. The tube can be pressed flat easily along this projecting portion, which serves as the guide.

Plural projecting portions are formed on the main body of the tube. These projecting portions improve decorativeness of the tube. When the projecting portions are onto the substrate layer, a certain number of projecting portions can be designated for the specified contents with which the tubular container or the pouch container molded from the laminated tube is filled. From the number of the projecting portions, the user will be able to distinguish the contents, e.g., inside the tubular container, simply by touching the container. This feature is convenient especially for the blind. It is also convenient for the user with ordinary sight in using plural tubular containers for different purposes.

Since the projecting portions are disposed axisymmetrically, the tube can be pressed flat along the axisymmetrical projecting portions. The tubular containers or the pouch containers are molded easily by cutting the laminated tube to a certain length and sealing one end of the tube. Also when the contents are squeezed out of the tubular or pouch container, the projecting portions serve as the guide to press flat the tubular or pouch container. The contents, such as cream having certain viscosity, can be easily forced out of the tubular container or the pouch container, and the container handling is improved.

The projecting portions with different widths are formed on the substrate layer that makes up the main body of the tube. These projecting portions improve decorativeness, and make the tube look attractive, and allow characters to be printed on the wide areas.

The projecting portions are disposed at equal intervals on the substrate layer that makes up the main body of the tube. Since a stripe pattern is formed over the entire tube surface, the tube shows improved decorativeness.

The outer layer is formed on the substrate layer, which makes up the main body of the tube, so as to give a graded effect caused by the projecting portions. The tube has the improved decorativeness because of the gradation created by the projecting portions.

The main body of the tube comprises an aluminum laminating material, and the outer layer having or consisting of a projecting portion or portions are laminated onto this material. The projecting portion or portions serve as the backbone and reinforce the aluminum laminated tube. Since the projecting portions are formed on the aluminum laminating material having a metallic silver color, the tube has improved decorativeness, and shows a high-class image.

The outer layer having or consisting of the projecting portions is laminated onto the substrate layer that makes up the main body of the tube. Not only surface irregularity but also additional colors improve the decorativeness because the outer layer has or consists of a projecting portion or portions in a different color or colors that make it easy to identify the tube clearly.

There can be formed waveform projecting portions on the substrate layer that makes up the main body of the tube. There can be formed spiral projecting portions. In addition to linear projecting portions, the projecting portions in various patterns formed on the substrate layer serve to improve decorativeness and visual attractiveness of the laminate tube.

The decorativeness of the tube is improved because each projecting portion has a different color and because the projecting portions of attractive colors form a stripe or waveform pattern.

The tube with added decorativeness can be used to mold an elaborately designed tubular container or pouch container.

The invention claimed is:

1. A tube comprising:
a cylinder-shaped substrate layer that makes up a main body of the tube; and
a linear projecting portion that extends straight along an entire axial length of the tube in an axial direction, the linear projecting portion being positioned on an outer surface of the cylinder-shaped substrate layer,
wherein an outer layer is laminated on the cylinder-shaped substrate layer to form the tube;
the linear projecting portion that extends straight along the entire axial length of the tube in an axial direction is raised on the outer layer to form a convex shape without concave portions on the outer layer;
a thickness of the tube on either side of the linear projecting portion is equal, and less than a thickness of the tube at the position of the linear projecting portion such that the tube is bendable and as a result foldable at portions to either side of the linear projecting portion; and
the tube is cut to a given length, flattened and sealed at at least one end.

2. The tube according to claim 1, wherein the cylinder-shaped substrate layer is more flexible than the outer layer, which is harder than the cylinder-shaped substrate layer.

3. The tube according to claim 1, wherein a plurality of linear projecting portions are raised on the outer layer.

4. The tube according to claim 1, wherein a pair of linear projecting portions is raised axisymmetrically on the outer layer in a cross-sectional view.

5. The tube according to claim 3, wherein at least some of the plurality of linear projecting portions have different widths.

6. The tube according to claim 3, wherein an even number of the plurality of linear projecting portions are positioned at equal intervals around the main body.

7. The tube according to claim 1, wherein the outer layer gives a graded effect caused by a change in thickness of the outer layer.

8. The tube according to claim 1, wherein the cylinder-shaped substrate layer is made of an aluminum-laminated material.

9. The tube according to claim 1, wherein the main body of the tube and the linear projecting portion have different colors.

10. The tube according to claim 3, wherein the plurality of linear projecting portions are spirally disposed.

11. The tube according to claim 3, wherein the plurality of linear projecting portions have a wave form.

12. The tube according to claim 3, wherein each projecting portion has a different color.

13. The tube according to claim 1, wherein the tube is provided with a head portion at one end, the head portion including a shoulder and a neck.

14. The tube according to claim 1, wherein the linear projecting portion serves as a backbone of the main body of the tube and stably maintains a form of the tube.

15. The tube according to claim 1, wherein the outer layer and the linear projecting portion are made of the same material.

* * * * *